United States Patent [19]
Kosowsky et al.

[11] Patent Number: 5,767,802
[45] Date of Patent: Jun. 16, 1998

[54] IFF SYSTEM INCLUDING A LOW RADAR CROSS-SECTION SYNTHETIC APERTURE RADAR (SAR)

[75] Inventors: Lester Kosowsky, Stamford, Conn.; Edward Stockburger, Norwood, Mass.; Kevin W. Lindell, Trumbull, Conn.

[73] Assignee: Northrop Grumman Corporation, Los Angeles, Calif.

[21] Appl. No.: 783,383

[22] Filed: Jan. 10, 1997

[51] Int. Cl.$^6$ .............................. G01S 13/78; G01S 13/90
[52] U.S. Cl. .................................... 342/45; 342/25
[58] Field of Search ................................ 342/25, 45

[56] References Cited

U.S. PATENT DOCUMENTS

| | | | |
|---|---|---|---|
| 3,993,994 | 11/1976 | Goggins | 342/25 |
| 4,786,906 | 11/1988 | Krogager | 342/25 |
| 5,274,379 | 12/1993 | Carbonneau et al. | 342/45 |
| 5,299,227 | 3/1994 | Rose | 375/1 |
| 5,424,737 | 6/1995 | Lindell | 342/5 |
| 5,519,403 | 5/1996 | Bickley et al. | 342/352 |
| 5,646,623 | 7/1997 | Walters et al. | 342/129 |
| 5,677,694 | 10/1997 | Chevalier et al. | 342/45 |

OTHER PUBLICATIONS

"A Unique Joint Stars Phased–Array Antenna", H. Shnitkin, Norden Systems, Inc., Norwalk, CT, Microwave Journal, Jan., 1991, pp. 131–136 and 141.

"Joint Stars Phased Array Radar Antenna", H. Shnitkin, Westinghouse Norden Systems, Inc., IEEE AES Systems Magazine, Oct. 1994, pp. 34–40.

*Primary Examiner*—John B. Sotomayor
*Attorney, Agent, or Firm*—Walter G. Sutcliff

[57] ABSTRACT

An IFF system including an interferometric ultra-high resolution synthetic aperture (SAR) radar located on an aircraft and a respective transponder located on one or more ground targets which may be, for example, ground vehicles. Each transponder is responsive to RF pulses transmitted from the radar and includes means for generating an identification code which then modulates the radar return with a coded signal indicative of the target's identity. Upon receiving the signal from the transponder, the radar processes the signals in an interferometric moving target focusing (IMTF) mode and a high resolution SAR processing mode to provide signals indicative of both moving and fixed targets with ID data superimposed thereon. Target ID extraction apparatus also having the same identification code applied thereto is included in the radar signal processor and extracts the target ID by a correlation technique which is then displayed along with the radar image of the target in question.

14 Claims, 9 Drawing Sheets

FIG.12

IFF SYSTEM INCLUDING A LOW RADAR CROSS-SECTION SYNTHETIC APERTURE RADAR (SAR)

CROSS REFERENCE TO RELATED APPLICATION

This application is related to U.S. Ser. No. 08/331,076, (Docket No. N-1234) entitled, "Interferometric Moving Vehicle Imaging Apparatus and Method", filed in the name of Edward F. Stockburger et al on Oct. 28, 1994, and U.S. Ser. No. 08/668,897, (Docket No. N-1281) entitled, "Multi-Mode Radar System Having Real-Time Ultra-High Resolution Synthetic Aperture Radar (SAR) Capability", filed in the names of Miguel E. Loiz et al on Jun. 24, 1996.

These applications are assigned to the assignee of the present invention and are intended to be incorporated herein by reference.

BACKGROUND OF THE INVENTION

1. Field of the Invention

This invention relates generally to radar imaging of ground targets using an airborne interferometric synthetic aperture (SAR) radar and more particularly to an IFF system including such a radar wherein a coded identification signal generated by a transponder located on a ground target is impressed on the radar return signal and then detected and displayed together with an image of the target in a virtually clutter free environment.

2. Description of Related Art

Recent military conflicts have vividly demonstrated that a large number of casualties result from friendly fire rather than from enemy engagement. The cause, in most instances, is mistaken identity of the target and the inability of even the most sophisticated sensor systems e.g. radar to provide a signature indicative of the target identity, often within the context of similar targets in a rapidly evolving battle scenario.

With respect to aircraft flying over terrain including both friendly and hostile vehicles, there is a need for an IFF system integrated into an airborne radar system capable of viewing and identifying both moving and stationary targets. Such a system should be passive and not add significantly to the radar cross-section of the aircraft upon which it is placed. However, it must be discernable in a clutter environment and produce a distinctive signal which contains information as to the identity of the target.

Air-to-ground radar systems which operate in an airborne moving target indicator (AMTI) mode or a synthetic aperture radar (SAR) mode are generally known to those skilled in the art. The AMTI mode is used to detect, locate and track moving objects, while the SAR mode is generally used to image stationary objects.

More recently, interferometric synthetic aperture (SAR) radar systems have been developed, for example, such as shown and described in the above cross-referenced related applications, to image both moving and stationary targets. Such systems include a plurality of simultaneously operating apertures, receivers and processing channels which together coherently process RF return signals to image a moving target, for example, by correcting for the different phase centers of the apertures and interferometrically combining the return signals from the different apertures which attenuates the energy from stationary objects. The azimuth location of the target is then determined within the main beam clutter spread and is then tracked and imaged in the range doppler domain.

High range resolution, moreover, is required in military tactical and surveillance systems and is typically achieved by using a high bandwidth RF pulse, i.e. a narrow pulsewidth, which is generated using pulse compression techniques. As an example, a pulse compressed to one nanosecond pulsewidth can achieve a one foot range resolution. Resolution in the doppler dimension is achieved by doppler filtering typically using Fast Fourier Transform techniques. Similar to inverse synthetic aperture radar, the images produced by interferometric SAR processing of the doppler information is a function of the relative geometry and rotational motion of the vehicle with respect to the SAR platform.

With the advent of such ultra-high resolution SAR multi-aperture antenna systems featuring, among other things, target and clutter cancellation, it now becomes feasible to provide a unique low cost, IFF system which may be deployed relatively quickly to determine target identity.

SUMMARY

Accordingly, it is an object of the present invention to provide an IFF system for identifying a ground target with an airborne radar system.

It is another object of the invention to modulate a radar return signal by a code at the target for extraction by an airborne radar system to identify the target as either a friend or foe.

It is a further object of the invention to generate a doppler identification signal at the target which can be controlled by a secure and a readily changeable code that identifies the object bearing the code and which can be superimposed on a radar return signal by a transponder located on the target.

It is yet another object of the present invention to utilize a target and clutter cancellation mode of an interferometric synthetic aperture radar system to extract the identification of a ground target whose identity is superimposed on the radar return signals.

The foregoing and other objects are achieved by an interferometric ultra-high resolution synthetic aperture (SAR) radar located on an aircraft and a transponder located on a ground target which may be, for example, a ground vehicle. The transponder is responsive to RF pulses transmitted from the radar and includes means for generating an identification code which then modulates the radar return with a coded signal indicative of the target's identity. Upon receiving the signal from the transponder, the radar processes the signals in an interferometric moving target focusing (IMTF) mode and a high resolution SAR processing mode to provide signals indicative of both moving and fixed targets with ID data superimposed thereon. Target ID extraction apparatus also having the same identification code applied thereto is included in the radar signal processor and extracts the target ID by a correlation technique which is displayed along with the radar image of the target in question. In its preferred form, the transponder comprises a passive retro-reflector of the Luneberg lens type.

Further scope of applicability of the present invention will become apparent from the detailed description provided hereinafter. It should be understood, however, that the detailed description of the preferred embodiment is given by way of illustration only, since various changes and modifications coming within the spirit and scope of the invention will become apparent to those skilled in the art.

BRIEF DESCRIPTION OF THE DRAWINGS

The present invention will become more fully understood when considered together with the accompanying drawings which are provided by way of illustration and are not to be considered to be limitative of the present invention, and wherein.

DETAILED DESCRIPTION OF THE PREFERRED EMBODIMENT

Figure 1:
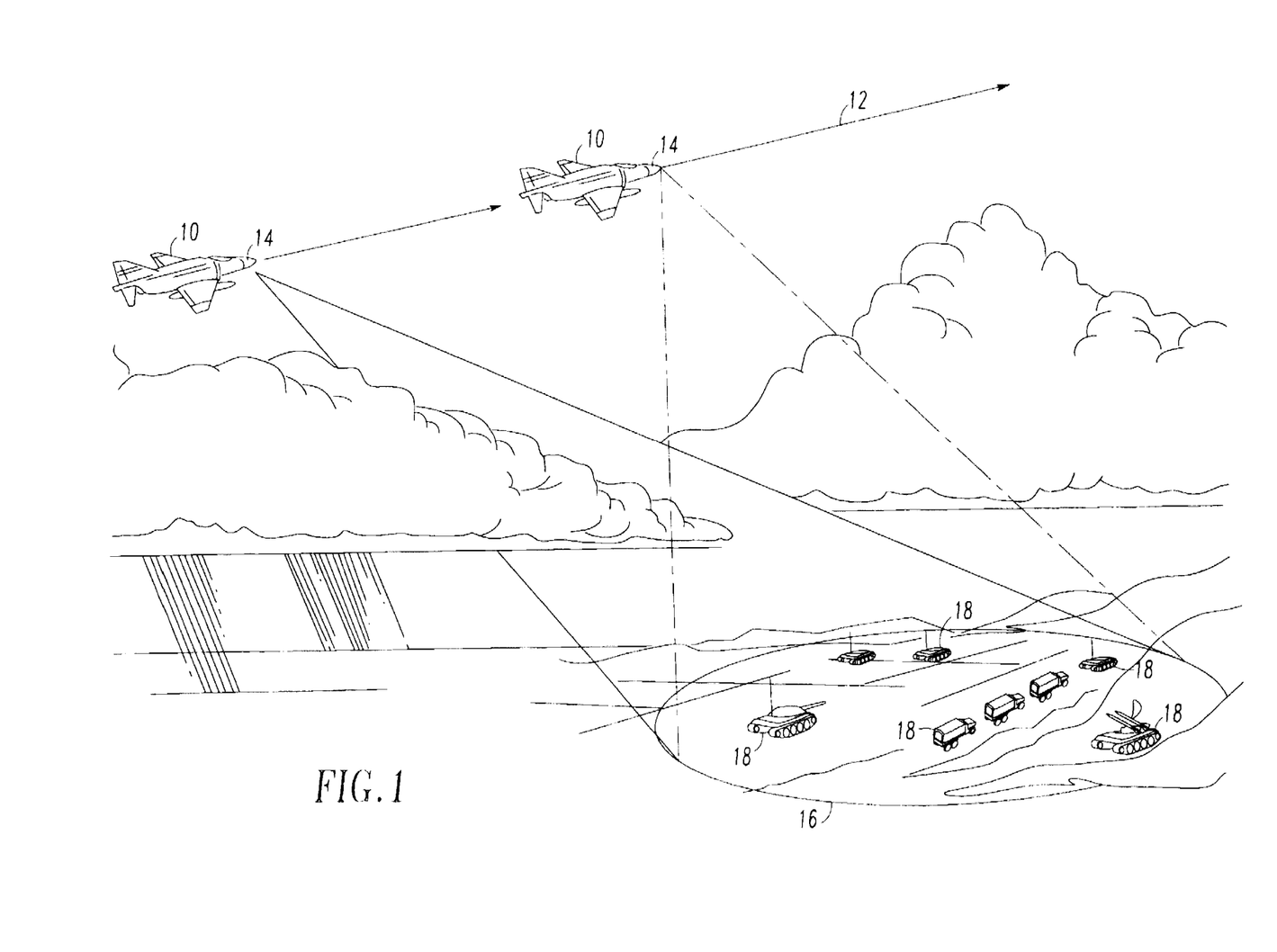
FIG. 1 is a diagram illustrative of an operational environment of the present invention.

Referring now to the figures wherein like reference numerals refer to like elements throughout, reference numeral 10 depicts an aircraft flying along a flight path 12. The aircraft 10 is equipped with a synthetic aperture radar (SAR) system shown generally by reference numeral 14. The SAR system operates in a well known manner and transmits a series of RF pulses towards a scene 16 and receives backscattered RF energy whose information content is indicative of the terrain and any other reflecting objects 18 on the terrain and which may consist of both stationary and moving objects such as trucks, tanks and other types of vehicles.

As further shown in FIG. 1, a short time after the SAR system 14 transmits a series of RF pulses, the aircraft 10 has moved to a forward position along the flight path 12 and again transmits RF pulses towards the SAR scene 16. The system 14 is designed so that the distance traveled by the aircraft 10 between pulse transmissions is less than one half the illuminating aperture size when the radar's line of sight is perpendicular to the radar platform's velocity vector. The received RF energy at the second location of the aircraft 10 is indicative of the SAR scene 16, but this time it is taken from a different view. Since radar signals travel at a known velocity, i.e. the speed of light, it is known precisely when a return signal is likely to come from the SAR scene 16 at a given range from the aircraft 10.

Figure 9:
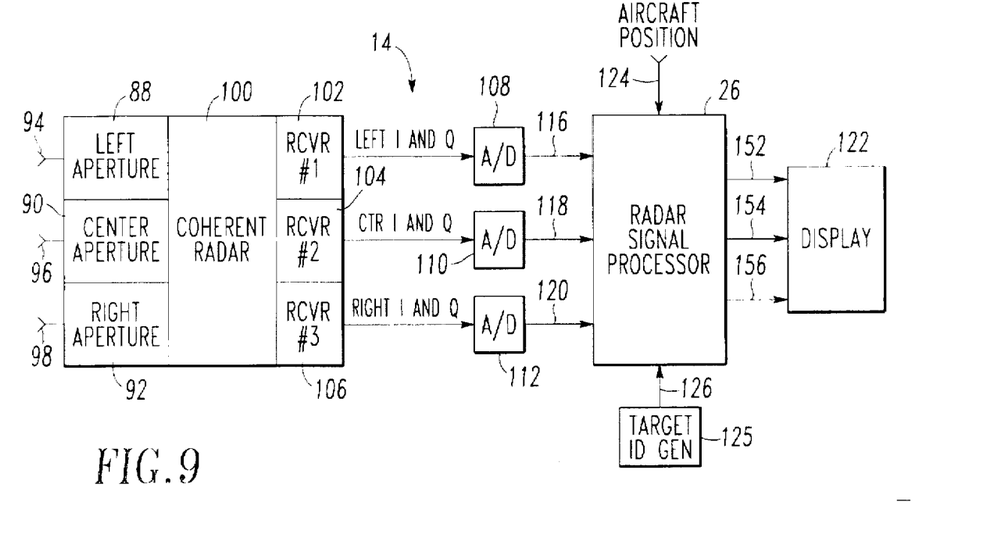
FIG. 9 is an electrical block diagram illustrative of an interferometric synthetic aperture radar system located onboard an aircraft such as shown in FIG. 1.

Accordingly, for each transmitted RF pulse there will be a plurality of return signals corresponding to the various scatterers within the SAR scene 16 located at various ranges from the aircraft. These returns can be processed in real time or off-line to create an image of the SAR scene 16 using the doppler history of the objects. Thus the returns can be coherently processed to image both moving and stationary objects within the SAR scene when the SAR radar system 14 comprises an interferometric type SAR system such as U.S. Ser. No. 08/331,076 cross referenced above, and which is characterized by a multi-aperture antenna including at least three apertures such as shown in FIG. 9, to be described hereinafter, and which permit clutter to be attenuated while providing high resolution images to be generated free of competing ground clutter. This is an ideal signal environment for a small passive IFF of low radar cross-section.

Figure 2:
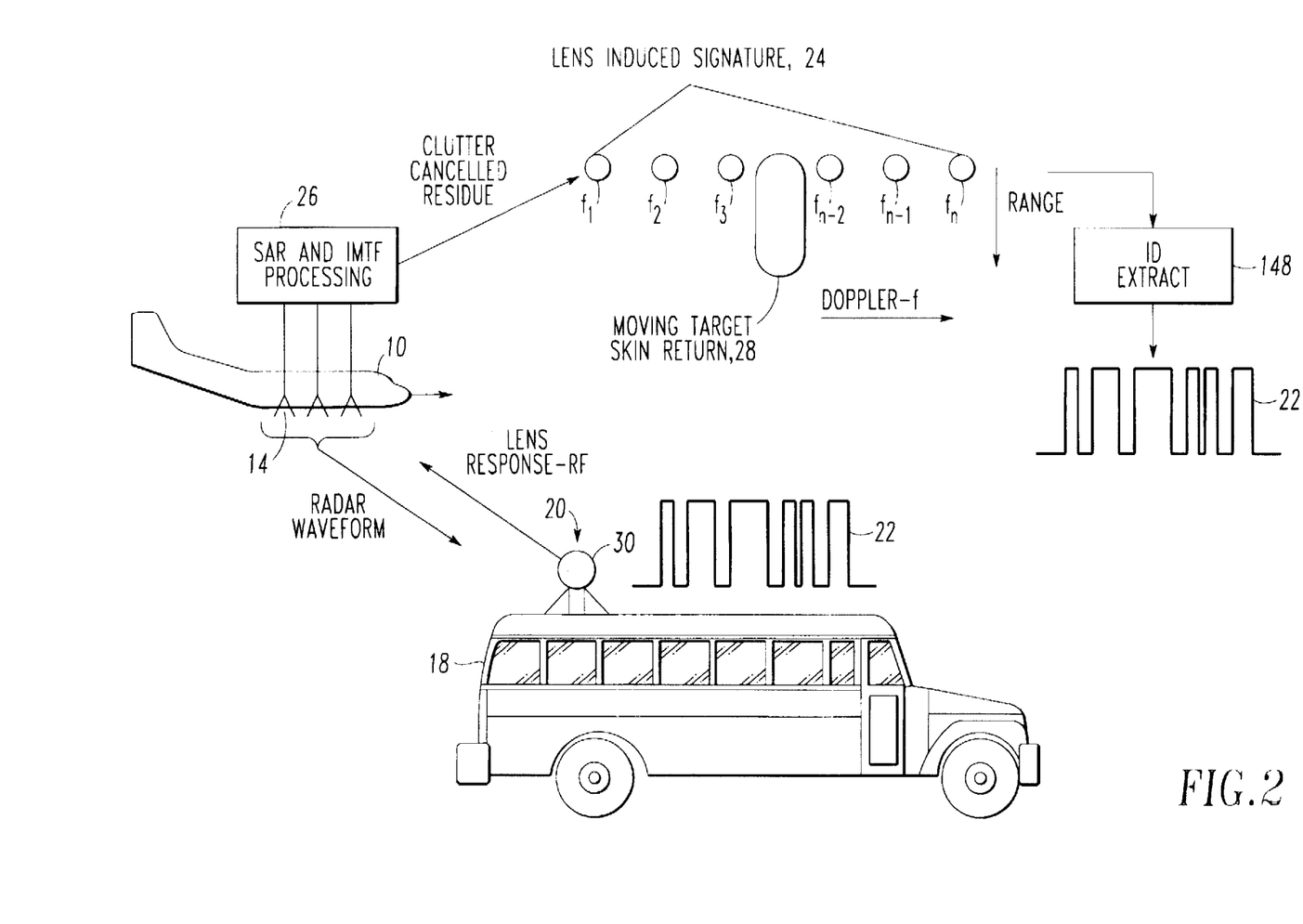
FIG. 2 is a diagram illustrative of the subject invention operating in connection with a moving target.
Figure 3:
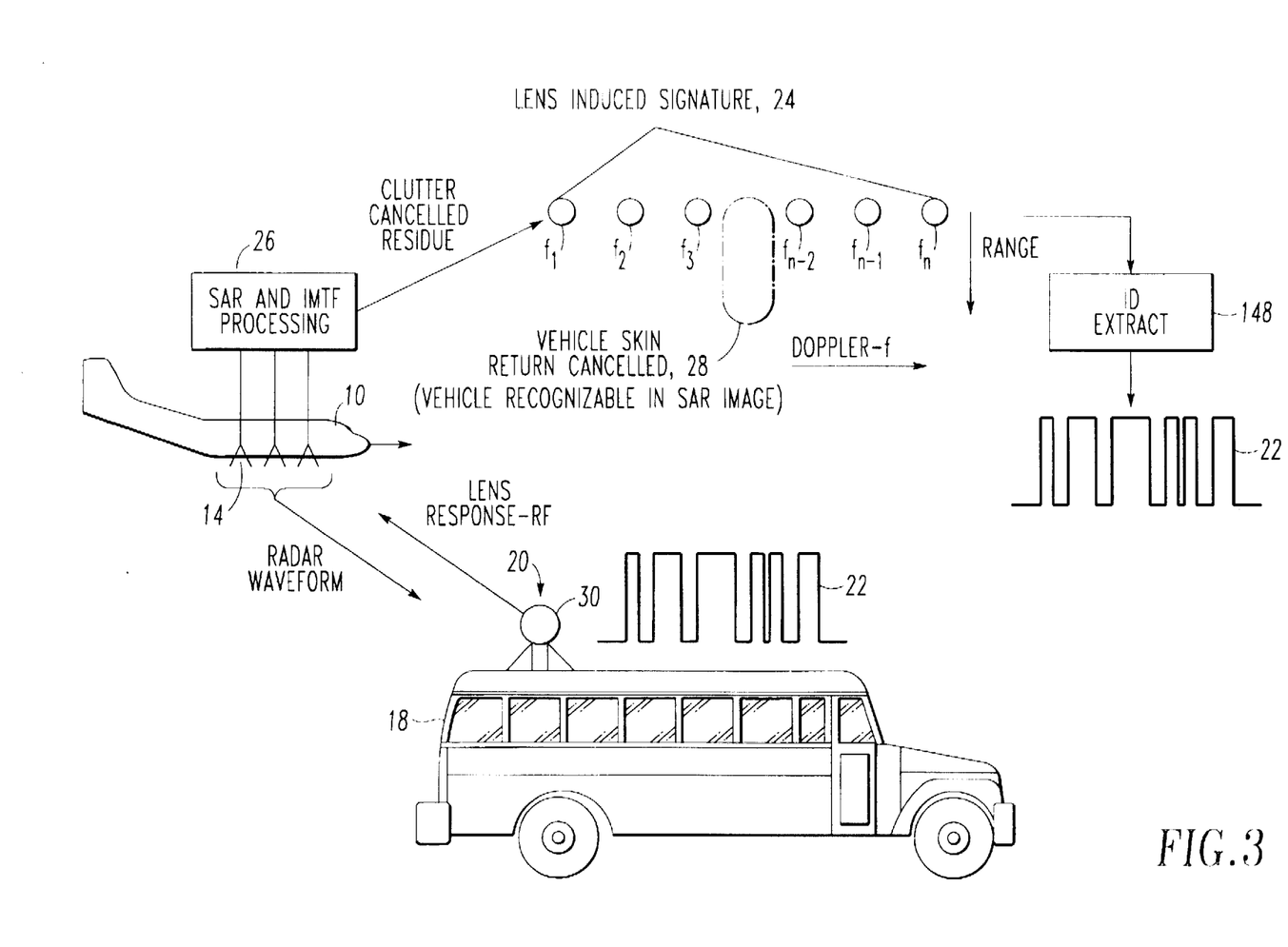
FIG. 3 is a diagram illustrative of the subject invention operating in connection with a stationary target.
Figure 4:
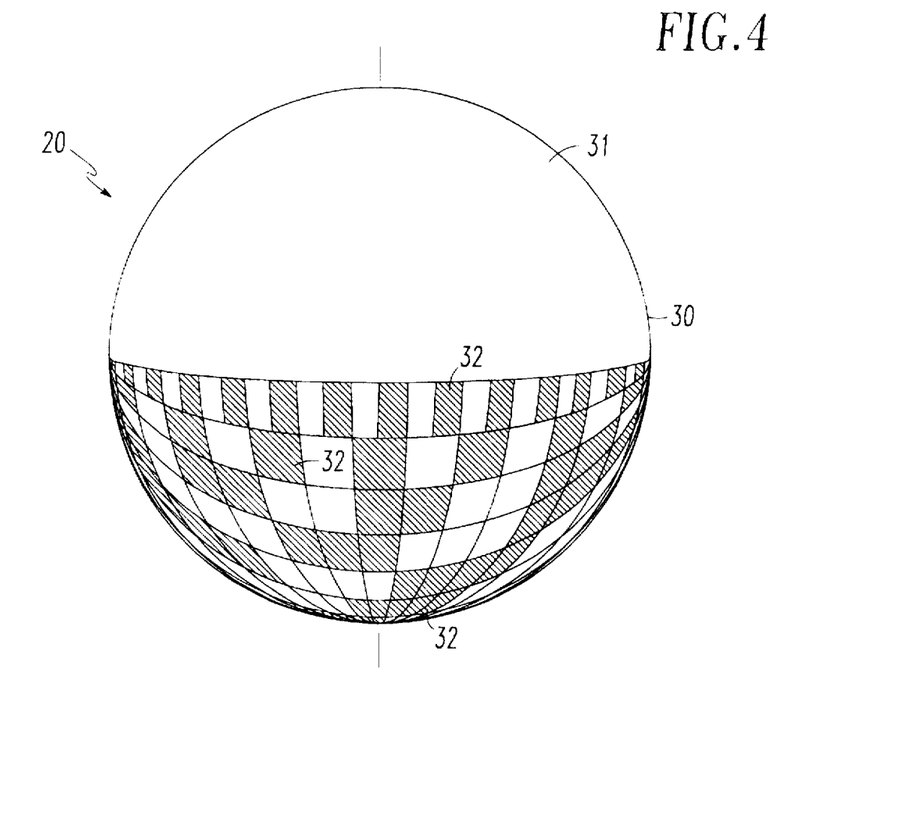
FIG. 4 is a diagram illustrative of a retroreflector transponder utilized in connection with the subject invention.

Referring now to FIGS. 2 and 3, the invention is directed to the concept of "friendly" ground vehicles 18 having an RF transponder 20 preferably in the form of a passive retroreflector 30 as shown in FIG. 4, and comprising a retrodirective Luneberg lens device 31 for receiving RF pulses from the SAR system 14 to module the received RF with a target identification code 22 in the form of a doppler signature signal 24 consisting of a plurality of frequencies $f_1$, $f_2 \ldots f_{n-1}$, $f_n$ which is then returned and extracted by a SAR processor shown by reference numeral 26 and thereafter displayed together with an image of the target 18. FIG. 2 is intended to show that the skin return 28 of a moving target 18 emerges from the clutter cancelled residue. In FIG. 3, the vehicle skin return of a stationary target is cancelled.

FIGS. 4–8 and 9–13 respectively disclose the implementation and operation of the transponder 20 and the SAR system 14.

Referring now to FIG. 4, the Luneberg retro-reflective lens 31 includes a plurality of reflector elements 32 formed into a mosaic covering a hemispherical portion of a spherical lens structure. Such a lens is shown and described, for example, in U.S. Pat. No. 5,424,737 entitled, "Communications Retro-Reflector" issued to Kevin W. Lindell, a coinventor of this invention.

Figure 5:
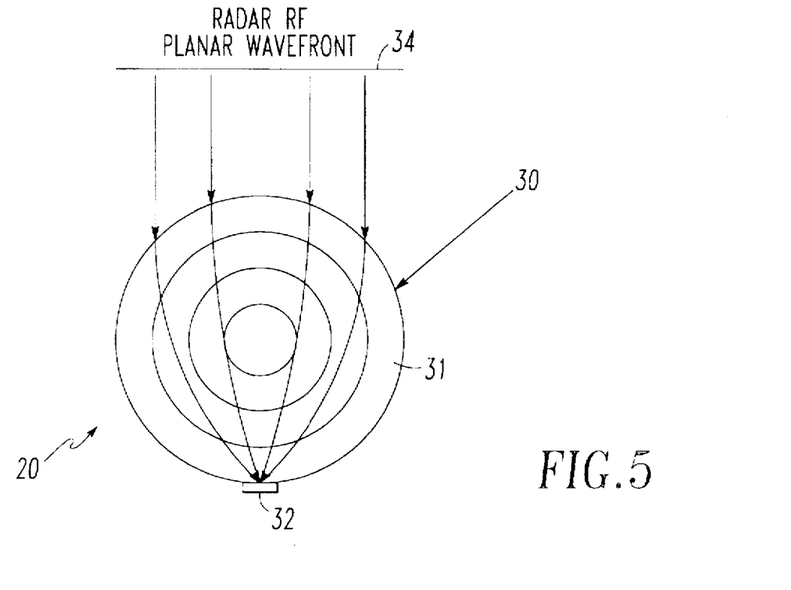
FIG. 5 is a schematic diagram illustrative of the operation of the retroreflector shown in FIG. 1 with a single mosaic element.

In FIG. 5, a planar wavefront 34 which in the present invention comprises a radar RF interrogating signal, is shown incident on the lens structure 31 which focuses the wavefront on a particular reflector 32 of the plurality of individual reflector elements 32 shown in FIG. 4. The incident radiation 34 is directed onto the reflector element 32 and is thereafter directed back to the interrogating source, i.e. the aircraft 10 and the SAR system 14 with an identification (ID) code which will now be explained.

Figure 6:
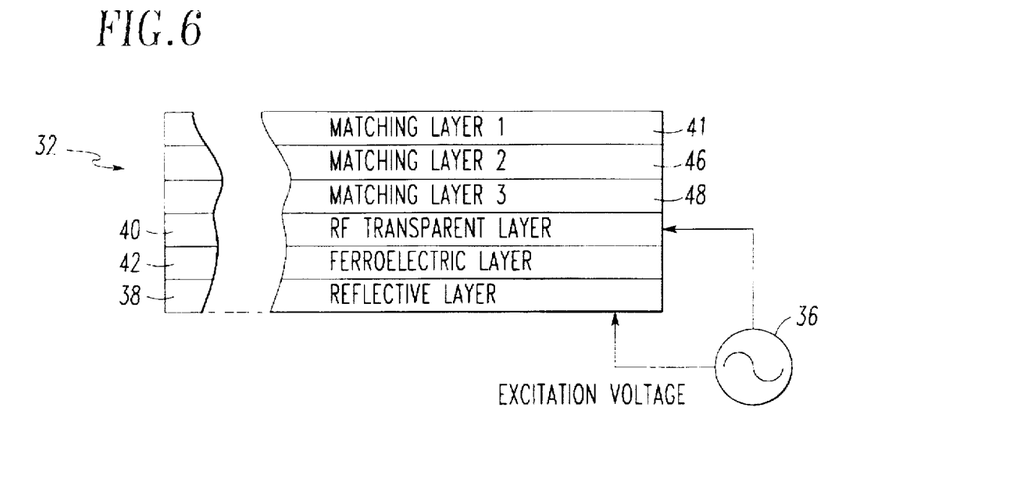
FIG. 6 is illustrative of the mosaic element shown in FIG. 5 embodied in a ferroelectric panel that can be modulated by an excitation voltage source.

As shown in FIG. 6, the reflector element 32 comprises a multi-layer element which can be excited by an excitation voltage from a source 36 in order to have its dielectric changed. In the present invention, the source 36 comprises a source for generating an ID coded signal 22 consisting of a doppler signature 24 such as shown in FIGS. 2 and 3. The ID coded signal 22 is impressed across a reflective layer 38, separated from an RF transparent layer 40 by a ferroelectric layer 42. Three matching layers 44, 46 and 48 are contiguously layered on top of the RF transparent layer 40.

In operation, the ferroelectric layer 42 has its permitivity changed according to the changes in the excitation voltage generated by the source 36. Thus the phase of a reflected planar wavefront 34 will change as a result according to changes in the excitation voltage generated by the source 36.

When desired, other types of modulation schemes can be implemented for modulating the reflected RF energy with an identification code for the vehicle 18 which, in effect, provides the vehicle with an IFF code which can be extracted and displayed by an interrogating aircraft 10 (FIG. 1). Although phase modulation is disclosed, an amplitude modulation type signal can also be used to implement a secure and readily changeable coded doppler signal which is superimposed on the radar return signals reflected from the lens 30.

Figure 7:
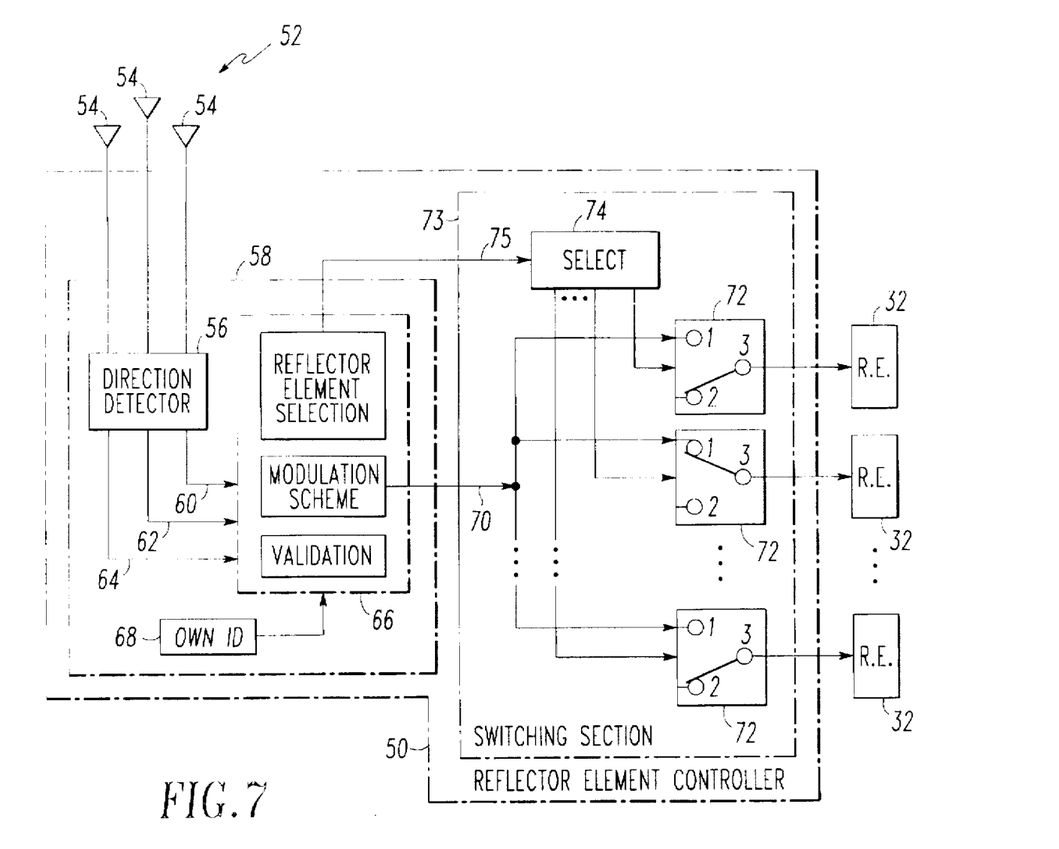
FIG. 7 is an electrical block diagram illustrative of a retroreflector element controller that may be used to select one of the reflector elements shown in FIG. 4 so as to be selected in accordance with the detected direction of an interrogation source for modulating the signal received therefrom.

FIG. 7 is intended to show how each of the plurality of reflector elements 32 shown in FIG. 1 can be separately controlled by one or more excitation control signal sources 36. Each element 32 can be hooked up to a separate excitation control signal source or one or more excitation control voltage sources can be shared by all of the reflector elements or by subsets thereof by the use of switching techniques, one example of which is shown in FIG. 7. There a reflector element controller 50 is shown being responsive to an incoming signal 52 from the aircraft 10. One or more directional antennas 54 sense the incoming signal 52 and a direction detector 56 within a detection, selection and modulation section 58 detects the direction of the interrogating source with respect to the antenna array 54 and provides one or more output signals on lines 60, 62 and 64, which may be signals indicative of the direction of the interrogating source in angular polar coordinates. A signal processor 66 receives direction signals from the lines 60, 62 and 64 as well as a signal from a self-identification generator 68 to output a signal on line 70 which is coupled to the proper reflecting element 32 via the closure of one of a plurality of switches 72 in a switching section 73 under the control of a switch selector 74. The switch selector 74 is controlled by the microprocessor 66 by virtue of the connection 75.

The signal processor 66 can carry out tasks that may be broadly characterized in three major groupings comprising: reflector element selection, control of modulation, and validation. The validation function is for the purpose of comparing the content of the identification signal generated by the ID generator 68 with information stored within a memory, not shown, within the signal processor 66 and depending upon validation and nature of the desired modulation or lack thereof is determined.

Figure 8:
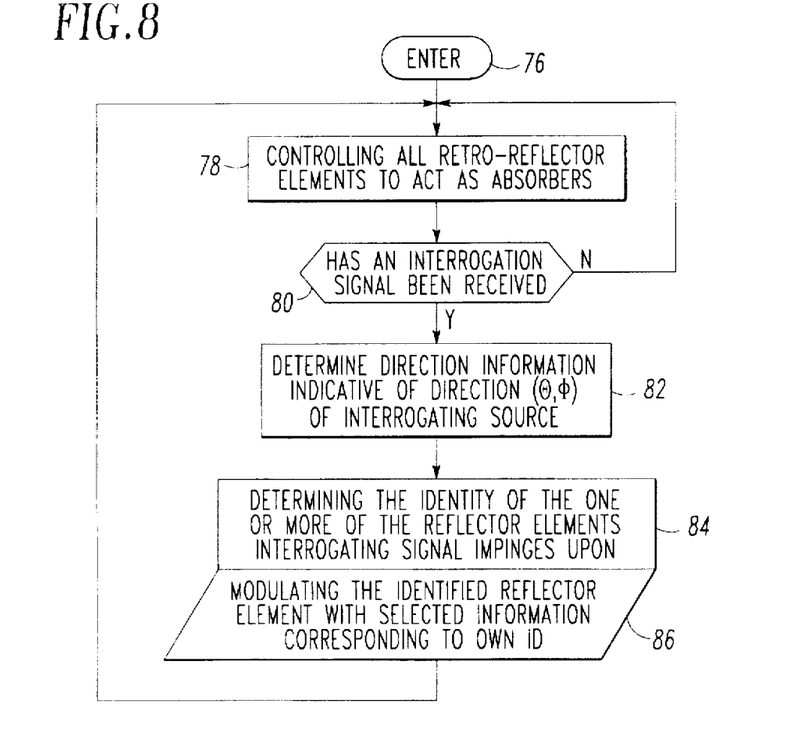
FIG. 8 is a flow chart illustrative of the operation of the retroreflector type transponder shown in FIG. 4.

The simplified flow chart depicted in FIG. 8 illustrates the steps that may be carried out by the signal processor 66 of FIG. 7. After entering in a step 76, a step 78 is executed to control all the retro-reflector elements 32 of FIG. 4 to act as absorbers. This reduces the reflectance cross-section from the perspective of any interrogating sources. A step 80 next determines whether an interrogation signal has been received. If not, the step continues to be executed to control all of the retro-reflector elements 32 as absorbers. Once an interrogation signal is detected in step 80, a determination is made in step 82 of the position of the interrogating source relative to the lens 30. Following this, a step 84 of determining the identity of one or more of the reflector elements 32 that the interrogating signal is impinging on is carried out. Following this, the identified reflector element 32 is modulated with selected information, e.g. the ID of the vehicle 18 as shown by step 86. A return is then made to step 78 for controlling all the retro-reflector elements to act as absorbers.

This now leads to a consideration of the SAR system 14 onboard the aircraft 10 shown in FIG. 1. As shown in FIG. 9, at least two but preferably three receive apertures corresponding to a left aperture 88, a center aperture 90 and a right aperture 92, are respectively coupled to transmit/receive RF antenna elements 94, 96 and 98 of a coherent pulse radar 100. The three apertures 88, 90 and 92 form an interferometer, since one of the three apertures allows clutter to be attenuated out of each range/doppler filter of the other two apertures resulting in the two clutter-cancelled apertures being implemented that provide accurate azimuth angle measurement. Although two apertures can be used, they are not preferable due to their inability to make unbiased measurements of the intrabeam location of a moving vehicle if the vehicle's range/doppler cell also contains returns from competing ground clutter. This concept is treated in detail in the above cross-referenced related application Ser. No. 08/331,076.

As shown in FIG. 9, each aperture 88, 90 and 92 has its own receiver 102, 104 and 106 which permits parallel signal processing of the backscattered RF signals arriving at each aperture 88, 90 and 92. Each receiver 102, 104 and 106 coherently processes its received signal data and provides both in-phase (I) and quadrature (Q) outputs which are fed to analog to digital (A/D) converters 108, 110 and 112 and which are then fed to a digital radar signal processor 26 (FIG. 1) via digital data busses 116, 118 and 120. The radar signal processor 26 processes the digital I and Q signal components to image both moving and fixed targets and to extract identification (ID) information contained in the received RF signals impinging upon the antennas 94, 96 and 98 and which is also displayed by means of display apparatus shown by reference numeral 122.

Further as shown in FIG. 9, aircraft position data obtained, for example from an inertial navigation system (INS), an inertial measurement unit (IMU) and/or a global positioning system (GPS), not shown, located on the aircraft 10 is inputted to processor 26 by a data bus 124. Also, target identification data corresponding to the coded signal 22 shown in FIGS. 2 and 3 is fed into the signal processor 26 from a doppler frequency target ID signal generator 125 by means of data bus 126 so that a secure and readily changeable code 22, in the form of a doppler frequency signature 24 can be entered on a periodic basis as needed for security purposes and which will be used in a signal correlation process to be described hereinafter.

Figure 10A:
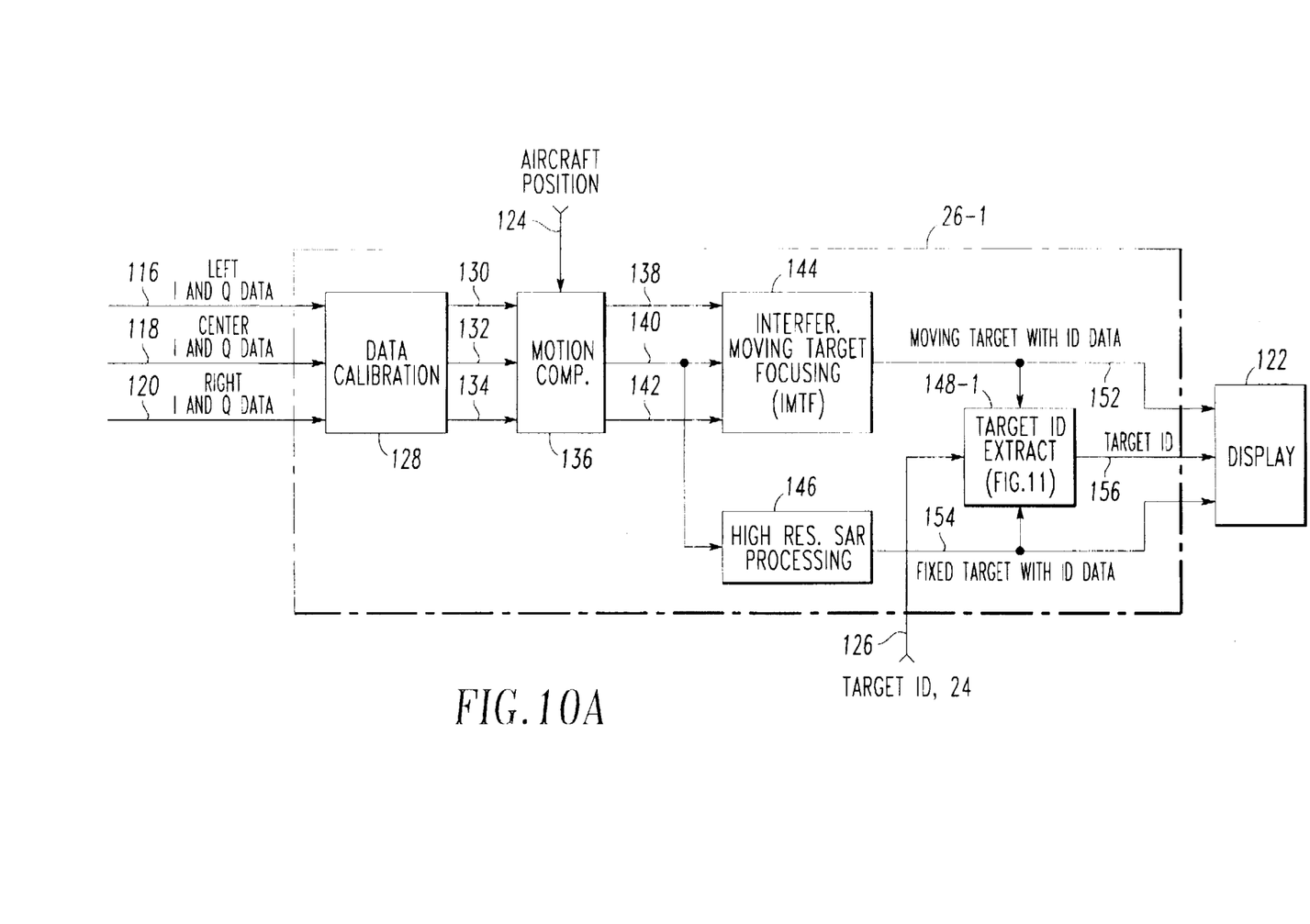
FIGS. 10A and 10B are electrical block diagrams of two types of radar signal processors included in the synthetic aperture radar system as shown in FIG. 9.
Figure 10B:
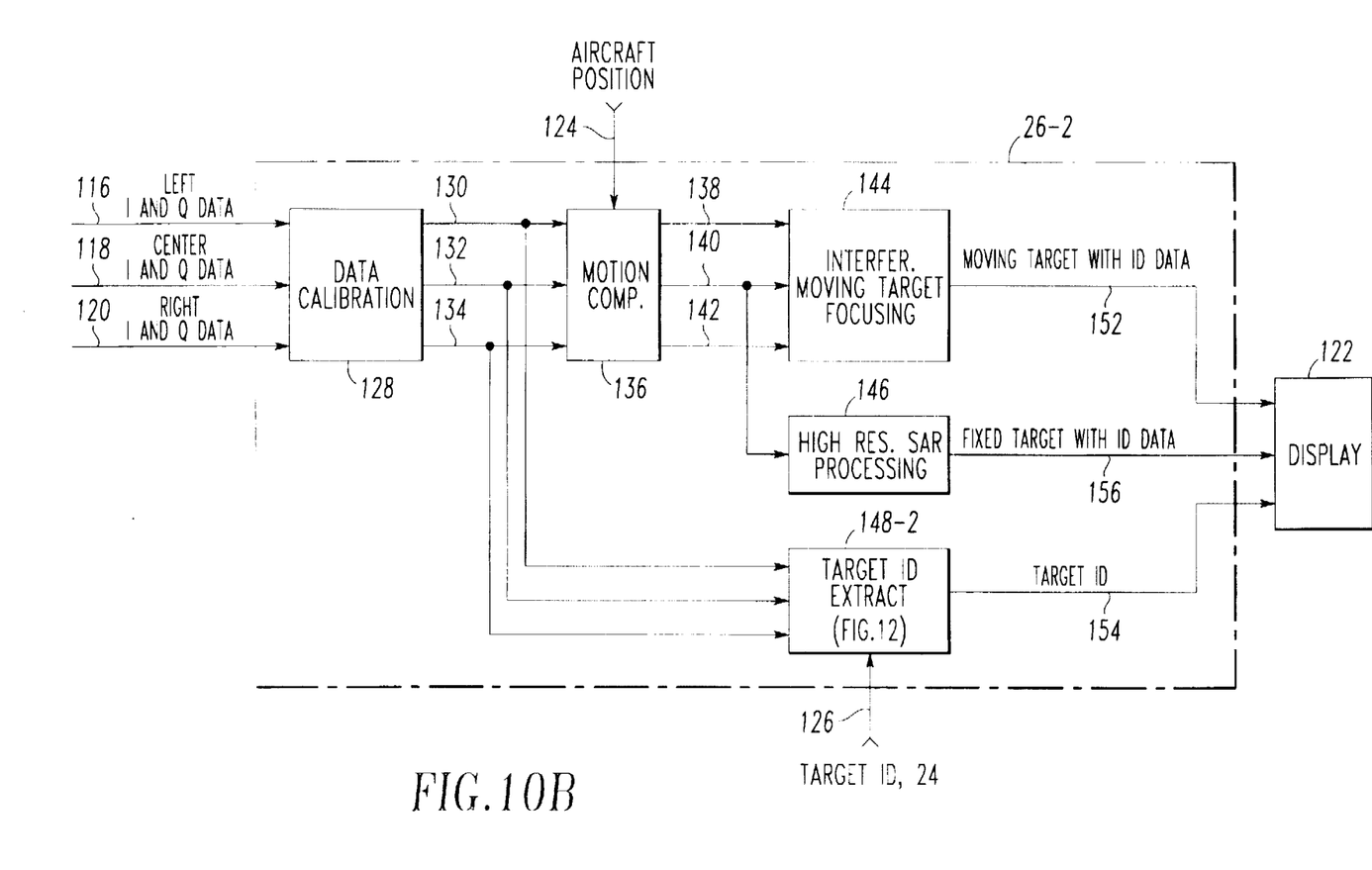

FIGS. 10A and 10B are illustrative of top level functional block diagrams of the signal processing routines which are performed by software in the radar signal processor 26 shown in FIG. 9. FIG. 10A is directed to the processor 26-1 which would be used in connection with a low data rate-low bandwidth operating mode of the SAR radar system 14 while FIG. 10B is illustrative of a processor configuration 26-2 used in connection with a high data rate-high bandwidth mode and differs from processor configuration 26-1 in the manner in which target identification is extracted from the I and Q signal data resulting from radar return signals being detected by the receivers 102, 104 and 106 (FIG. 9) coupled to the left, center and right apertures 88, 90 and 92.

As shown in FIG. 10A, digitized I and Q data signals from the left, center and right aperture as appearing on data busses 116, 118 and 120, are first subjected to a data calibration routine 128 to correct for any front end hardware inaccuracies. The data calibration routine 128 also includes a pulse compression subroutine, not shown, which provides compressed data in a well known manner in the frequency vs. time domain on data busses 130, 132 and 134. In general, the data calibration routine 128 includes as many hardware receiver chain error corrections as necessary to reduce the amount of error introduced by the receivers 102, 104 and 106.

The calibrated I and Q data is next subjected to a motion compensation routine 136 which compensates for the aircraft's motion with respect to the scene being illuminated by the radar system 14 such as shown in FIG. 1. Because the aircraft 10 is not flying on a perfectly straight line or at a constant velocity, the backscattered energy experiences a frequency shift and time delay, both as a function of time which must be corrected to provide a coherent phase history of the stationary targets and moving targets during a dwell time. The dwell time as used herein is the period of time over which the radar system illuminates an area and generally is about 0.1 second to about 10 seconds or more. These corrections are required in a high resolution SAR system in order to keep the individual scattering elements on a reflecting target resolvable over the dwell period and at squint angles other than 90°. In general, motion compensation is well known and involves electronically adjusting the phase of the received signals on busses 130, 132 and 134. The distance the apertures 88, 90 and 92 have moved pulse-to-pulse is typically calculated based upon the INS/IMU/GPS data inputted to data bus 124.

Following motion compensation, the data outputted on busses 138, 140 and 142 are used in an interferometric moving target focusing (IMTF) routine 144 to image moving targets while the motion compensated received signal from one of the channels, for example the center channel on bus 140, undergoes a high resolution SAR processing routine 146 to generate an image of stationary targets.

The details of the data calibration routine 128, the motion compensation routine 136 and the interferometric moving target focusing routine 144 and the high resolution SAR processing routine 146 are shown and described in the foregoing cross-reference related application Ser. No. 08/331,076 which is, as noted above, incorporated herein by reference.

Figure 11:
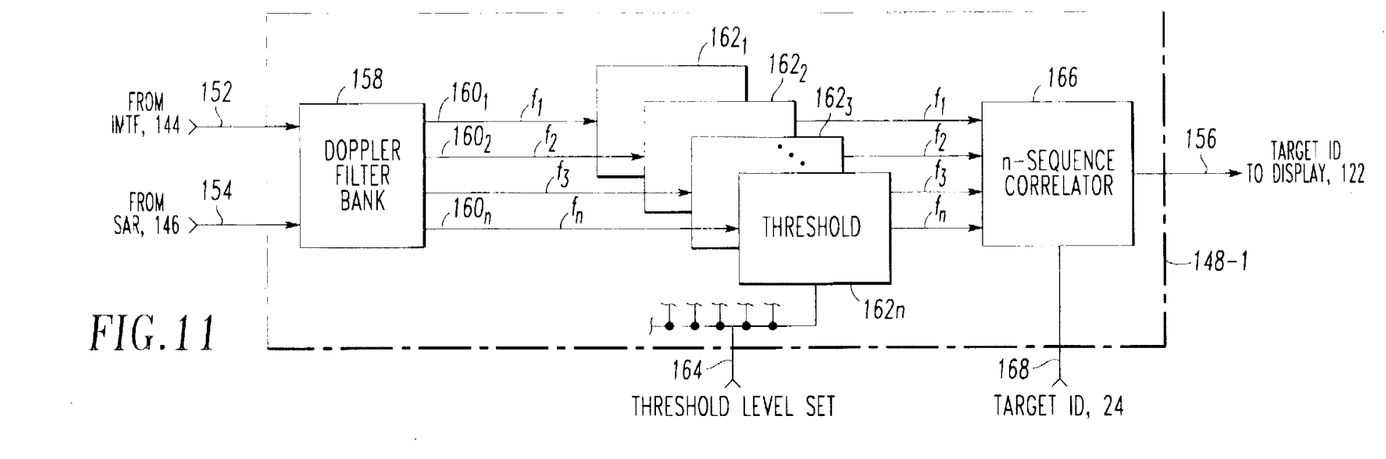
FIG. 11 depicts a routine for extracting an identification code where the radar system as shown in FIG. 9 operates at a low data rate and low bandwidth.
Figure 12:
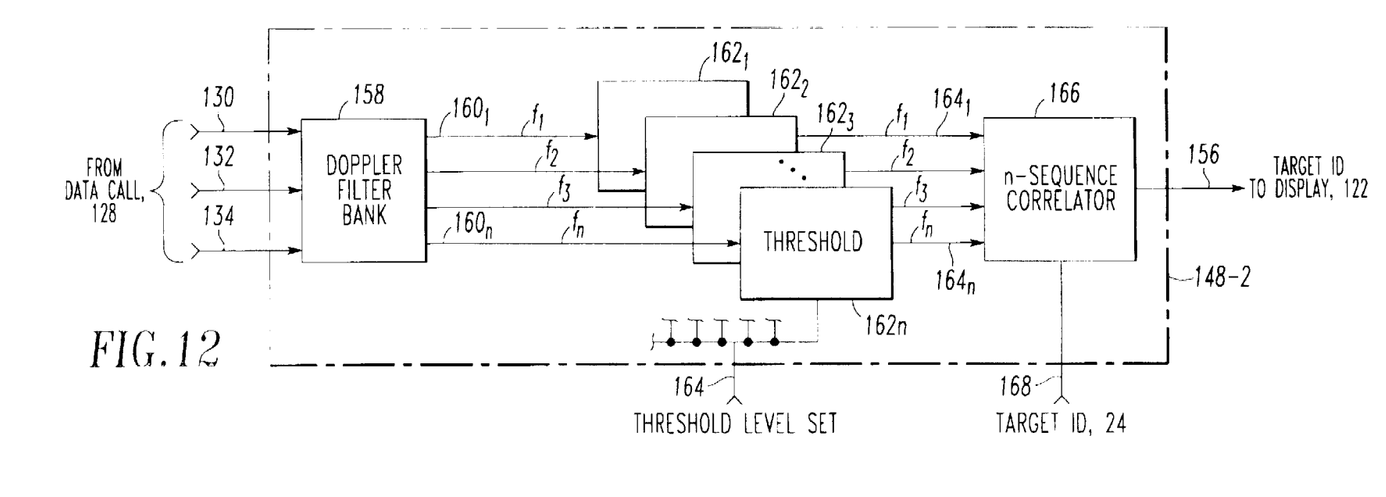
FIG. 12 depicts extraction of an identification code where the radar system is operating at a high data rate and high bandwidth.

The present invention now additionally includes means 148-1 shown in FIG. 11 for extracting the target ID code 22 (FIG. 1) used in connection with low data rate signals and means 148-2 as shown in FIG. 12 for extracting the code 22 for high data rate signals. In each instance, the SAR scene displayed by the display apparatus 122 consists of a composite image of moving targets, fixed targets and target ID associated therewith by virtue of image data signals respectively appearing on image data busses 152, 154 and 156.

Referring now to FIG. 11, the target ID extraction means 148-1 used in connection with low data rate signals is shown including a doppler filter bank 158 for filtering moving target data and fixed target data, both containing target ID information 24 in the form of a predetermined number of doppler frequencies $f_1, f_2 \ldots f_{n-1}, f_n$ and appearing on data busses 152 and 154 and resulting from the IMTF routine 144 and the SAR processing routine 146. Doppler output signals are outputted from the filter 158 and appear on data busses $160_1, 160_2$ and $160_n$ which are fed to respective threshold detectors $162_1, 162_2, 162_n$, each receiving a threshold level set signal applied to line 164. Doppler frequency signals having a magnitude exceeding a predetermined threshold are outputted by the threshold detectors $162_1 \ldots 162_n$ on busses $164_1 \ldots 164_n$ where they are subjected to correlation implemented by a n-sequence correlator 166. The correlator 166 also has a current target ID code fed thereto via bus 168 on a periodic basis and correspond, for example, to the doppler frequency signatures 24 shown in FIGS. 2 and 3 of friendly vehicles 18 and which consist of signals such as shown by reference numeral 22. The output of the correlator 166 comprises a verified target ID information image data signal which is fed to the display 122 via signal bus 156.

With respect to the target ID extraction for high data read signals, as shown in FIG. 12, it involves operating directly on pulse compression data outputted on busses 130, 132 and 134 resulting from the data calibration routine 128 (FIG. 10B), after which doppler filtering, threshold detection and correlation is carried out as before.

Thus what has been shown and described is an airborne IFF system utilizing both SAR and clutter suppression interferometry where a coded IFF signal is detected and displayed together with a SAR image of a radar ground target to identify the target.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:

1. An IFF system, comprising:

an interferometric synthetic aperture radar located on an aircraft and including at least two RF apertures for transmitting radar signals to a scene including one or more ground based targets and at least two RF receivers respectively connected to said apertures for receiving radar signals reflected from said scene; and signal processing means responsive to the received radar signals and being operable in an interferometric moving target focusing mode to cancel clutter, extract moving around based targets and generate first imaging signals of said moving targets, and being further operable in a high resolution SAR mode to extract stationary around based targets and generate second imaging signals of said stationary targets;

passive retro-reflector transponder apparatus, responsive to said radar signals transmitted from said radar, located on at least one of said around based targets and including means for generating a target identification signal, modulating said radar signals sensed by the transponder apparatus and retransmitting RF signals modulated with said identification signal back to said radar;

said signal processing means further being operable in a target identification extraction mode to extract the target identification signal and generate third imaging signals corresponding to the identification of a target including said transponder apparatus; and a radar display in said aircraft responsive to said first, second and third imaging signals to generate a composite image of moving targets, stationary targets and target identification of around based targets.

2. A system according to claim 1 wherein said at least two RF apertures and said at least two RF receivers comprise three RF apertures and three RF receivers.

3. A system according to claim 1 and additionally including means for supplying a target identification code both to said transponder and said signal processing means of said radar and wherein said target identification extraction means includes means for correlating the target identification code supplied to the radar with the target identification signals included in RF signals received by said radar.

4. A system according to claim 3 wherein said target identification code comprises a selectively changeable code.

5. A system according to claim 1 wherein said retro-reflector includes a lens, and a plurality of controllable reflector elements covering a predetermined portion of the lens.

6. A system according to claim 5 wherein each of said reflector elements has a respective absorption or reflective characteristic changeable in response to a control signal.

7. A system according to claim 6 and additionally including a controller for generating one or more control signals to determine direction of the arrival of RF signals from said radar apparatus and to control said characteristic of at least one of said reflector elements so as to modulate said RF signal with said target identification signal and reflect a modulated RF signal containing target identification signal back to said radar apparatus.

8. A system according to claim 7 wherein said lens comprises a Luneberg lens.

9. A system according to claim 8 wherein said ground based target comprises a ground vehicle.

10. An IFF method, comprising the step of:

transmitting RF signals from an interferometric synthetic aperture radar located on an aircraft;

canceling clutter, extracting moving ground targets and generating imaging signals of moving ground targets in an interferometric moving target focusing mode;

extracting stationary around targets and generating imaging signals of said stationary ground targets in a high resolution SAR mode;

receiving radar signals transmitted from said radar by at least one passive transponder including a retro-reflector located on one of said ground targets;

modulating the received radar signals with a target identification signal at the transponder and retransmitting the radar signals modulated with said identification signal back to said radar;

extracting said target identification signal at said radar by correlating stored doppler frequency signals corresponding to a target identification code with the target identification signals included in radar signals transmitted back to said radar; and imaging said identification signal at the radar together with imaging signals of said stationary and moving targets.

11. A method according to claim 10 and additionally including the step of periodically supplying a changeable target identification code both to said transponder and said radar.

12. A method according to claim 10 wherein said retro-reflector includes a lens, and a plurality of controllable reflector elements covering a predetermined portion of the lens.

13. A method according to claim 12 wherein each of said reflector elements has a respective absorption or reflective characteristic changeable in response to a control signal.

14. A method according to claim 13 and additionally including the steps of:

generating one or more control signals;

determining the direction of the arrival of the radar signals from said radar at said transponder;

controlling said characteristic of at least one of said reflector elements for modulating the received radar signal with said target identification signal; and thereafter retransmitting a modulated radar signal containing target identification signal back to said radar.

* * * * *